(12) United States Patent
Chen

(10) Patent No.: US 7,705,576 B2
(45) Date of Patent: Apr. 27, 2010

(54) HIGH-WIN CIRCUIT FOR MULTI-PHASE CURRENT MODE CONTROL

(75) Inventor: Keming Chen, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 737 days.

(21) Appl. No.: 11/263,220

(22) Filed: Oct. 31, 2005

(65) Prior Publication Data

US 2007/0096705 A1     May 3, 2007

(51) Int. Cl.
   *G05F 1/00*     (2006.01)
(52) U.S. Cl. .................................... 323/282; 323/225
(58) Field of Classification Search ................ 323/282, 323/225, 246, 267, 268, 271, 283, 285
   See application file for complete search history.

(56) References Cited

U.S. PATENT DOCUMENTS 5,157,269 A    10/1992    Jordan et al.
7,026,798 B2 *  4/2006    Cheung et al. ............... 323/225
2006/0164050 A1 * 7/2006    Hasegawa et al. ........... 323/272

FOREIGN PATENT DOCUMENTS

DE        10112039 A1    10/2002
JP        60134765 A      7/1985

* cited by examiner

*Primary Examiner*—Bao Q Vu
*Assistant Examiner*—Nguyen Tran

(57) ABSTRACT

A current mode control circuit uses a current comparing module to control a switching signal according to one of a plurality of current feedback signals. The current mode circuit comprises a voltage control module that generates an output voltage according to an input voltage and the switching control signal, and that generates the plurality of current feedback signals. The current comparing module outputs a control current signal that is indicative of a greater one of the plurality of current feedback signals. A current mode control module receives the control current signal and generates the switching control signal according to the control current signal.

19 Claims, 6 Drawing Sheets

HIGH-WIN CIRCUIT FOR MULTI-PHASE CURRENT MODE CONTROL

FIELD OF THE INVENTION

The present invention relates to current mode control for a multi-phase converter, and more particularly to current mode control with a single current mode controller.

BACKGROUND OF THE INVENTION

DC/DC converter circuits are used to receive an input DC voltage and output an output DC voltage. Typically, the output DC voltage is different than the input DC voltage. For example, a DC/DC converter circuit may act as a step-down DC/DC converter that outputs an output DC voltage that is less than the input DC voltage. The DC/DC converter circuit may act as a step-up DC/DC converter that outputs an output DC voltage that is greater than the input DC voltage. DC/DC converter circuits may also be used for other purposes, such as to provide noise isolation or regulate voltage levels.

Referring now to FIG. 1, an exemplary boost (step-up) DC/DC converter circuit 10 includes an inductor 12, one or more semiconductor switches such as a transistor 14, a diode 16, and an output capacitor 18. The converter circuit 10 receives an input voltage Vin across voltage inputs 20 and 22 and outputs an output voltage Vout across the output capacitor 18. The operation of the transistor 14 determines the inductor current. For example, when the transistor 14 is ON, the inductor current increases. When the transistor 14 is OFF, the inductor current decreases. In this manner, switching the transistor 14 ON and OFF controls the inductor current and the output voltage Vout. A DC/DC control module 24 generates a switching control signal (e.g. a PWM signal) 26 that switches the transistor 14 ON and OFF.

SUMMARY OF THE INVENTION

A current mode control circuit comprises a voltage control module. The voltage control module receives an input voltage and a switching control signal, generates an output voltage according to the input voltage and the switching control signal, and generates first and second current feedback signals. A current comparing module receives the first and second current feedback signals and outputs a control current signal that is indicative of a greater one of the first and second current feedback signals. A current mode control module receives the control current signal and generates the switching control signal according to the mode control current signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figures 1, 2:
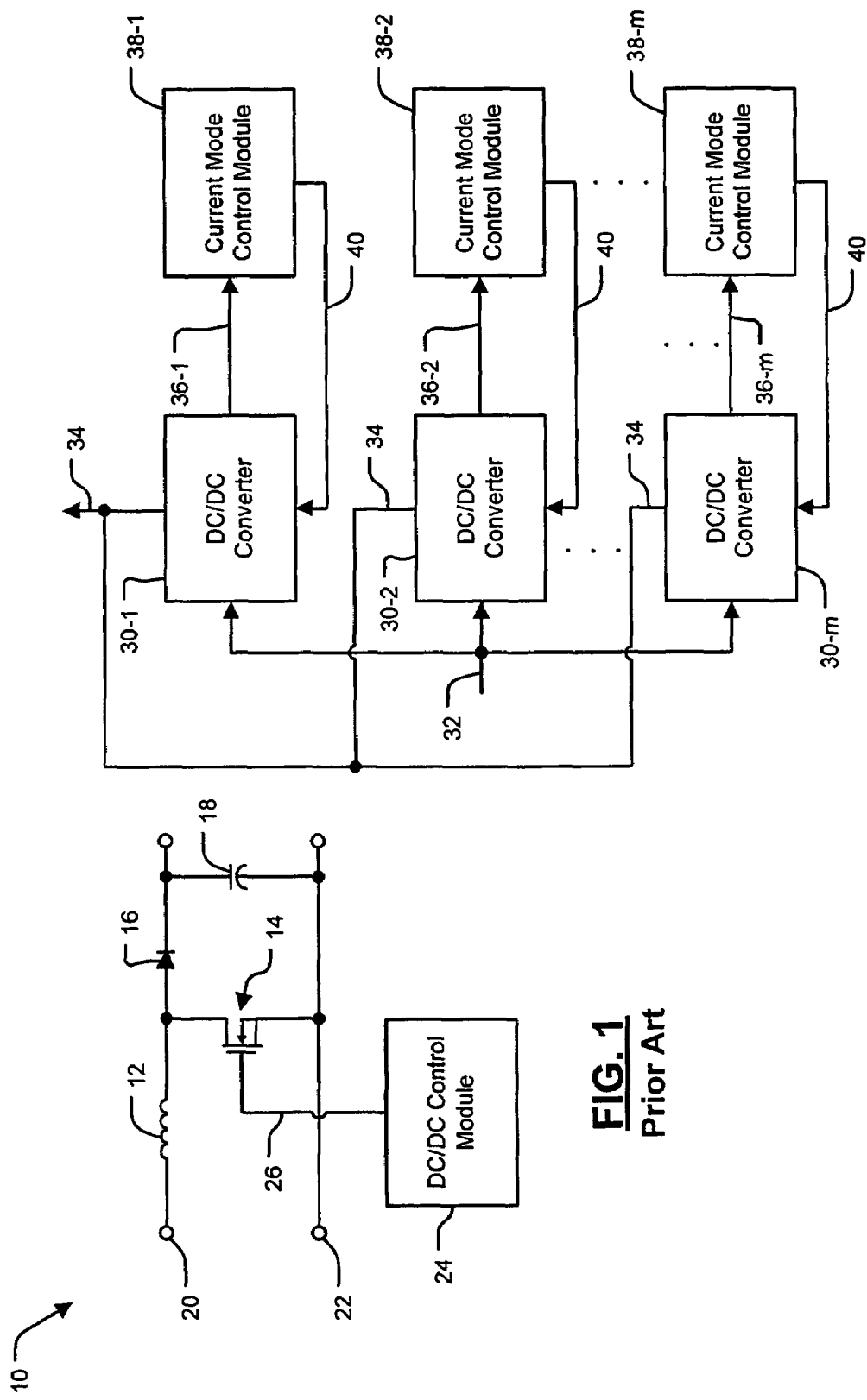
FIG. 1 is a circuit schematic of an exemplary DC/DC converter circuit according to the prior art.
FIG. 2 is a functional block diagram of an exemplary DC/DC converter control circuit according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 2, two or more DC/DC converters 30-1, 30-2, ..., and 30-m, referred to collectively as DC/DC converters 30, are used in parallel. The DC/DC converters 30 receive corresponding input voltage 32, and generate output voltage 34. The DC/DC converters 30 generate inductor currents 36-1, 36-2, ..., and 36-m as described in FIG. 1. One or more loads (not shown) receive the output voltages 34. For example, the output voltages 34 may provide power to one or more integrated circuit components.

Typically, the DC/DC converters 30 are not synchronized and generate inductor currents 36 that are in random order which can not provide ripple current canceling as multi-phase converter would provide.

Two or more current control modules 38-1, 38-2, ..., and 38-m, (e.g. current mode controllers), are used to control the inductor currents 36-1, 36-2, ..., and 36-m individually.

The current mode control modules 38 may be configured to effect peak current mode control, average current mode control, valley current mode control, or any other suitable current mode control. Various methods of PWM signal generation for peak, average, and/or valley current mode control are known in the art.

Alternatively, a multi-phase DC/DC converter 50 may be used as shown in FIG. 3A. A multi-phase DC/DC converter 50 includes a plurality of inductors and semiconductor switches (not shown) and generates a plurality of inductor current signals 52 and an output voltage signal 54. Current mode control modules 56 receive the inductor current signals 52 and generate PWM signals 58. In this manner, the current mode control modules 56 control the inductor current signals 52 in order to determine a single output voltage signal 54.

Figure 3:
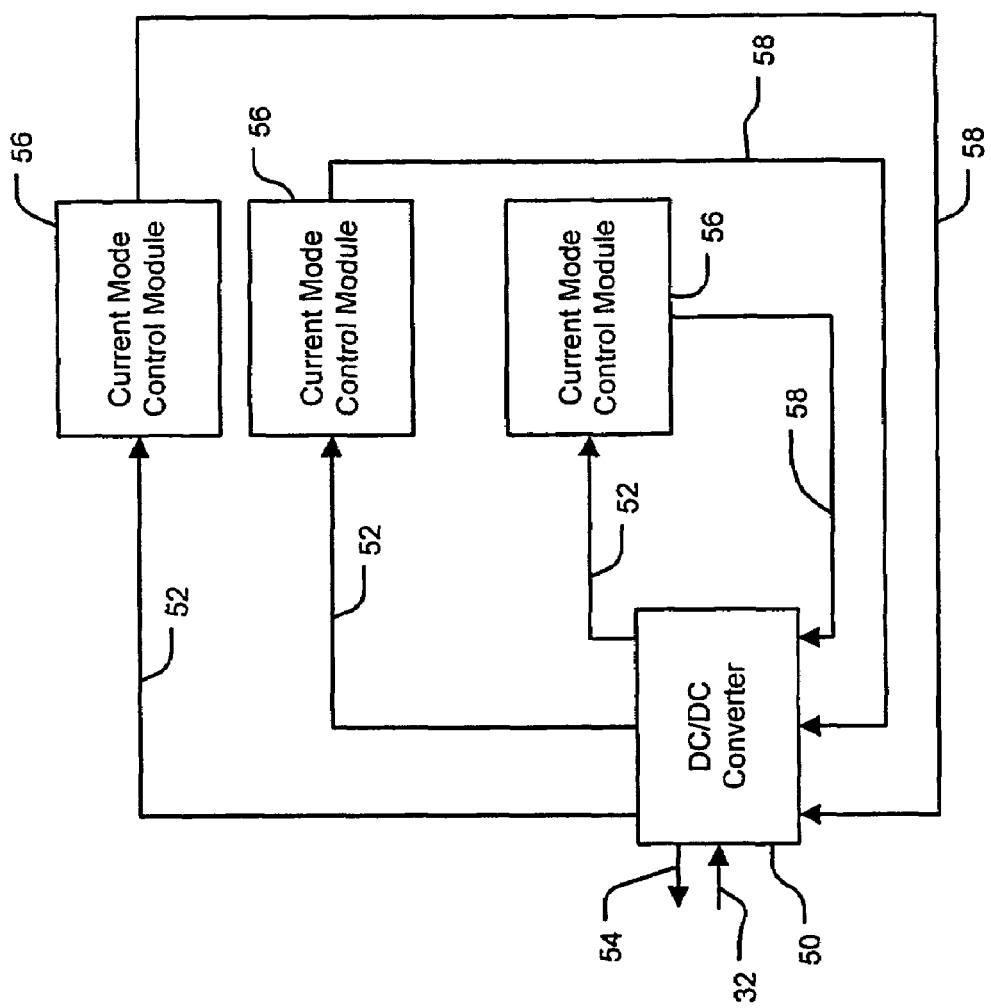
FIG. 3 is a functional block diagram of a multi-phase DC/DC converter according to the prior art.

As shown in FIG. 2 and FIG. 3, multiple current mode control modules are required to receive the individual inductor current signals and to synchronize the outputs of the DC/DC converters. As the number of DC/DC converters and/or the number of inductor current signals (i.e. current phases) in a DC/DC converter circuit increases, the number of current mode control modules increases accordingly. As a result, component cost, circuit size, and possibility of component failure increase as well.

Figure 4A:
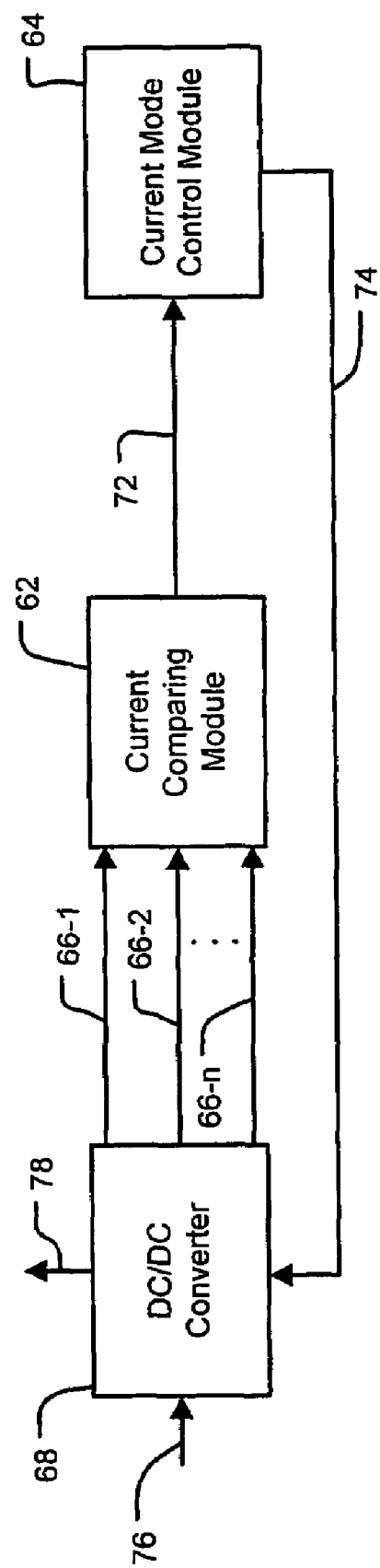
FIG. 4A is a functional block diagram of a current mode control circuit that includes a multi-phase DC/DC converter according to the present invention.
Figure 4B:
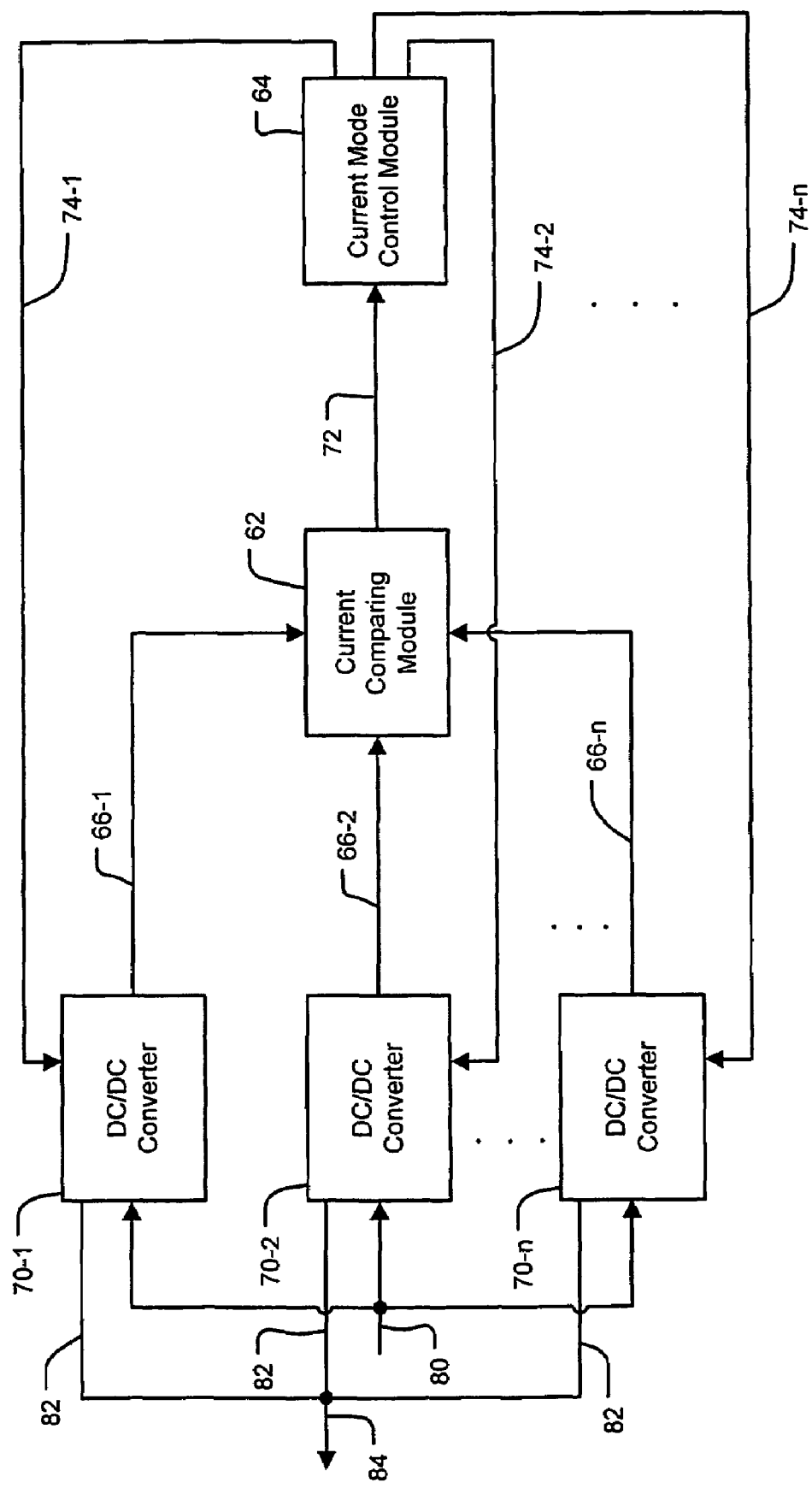
FIG. 4B is a functional block diagram of a current mode control circuit that includes multiple DC/DC converters according to the present invention.

The present invention eliminates the need for multiple current mode control modules to receive current signals from multiple DC/DC converters and/or to receive current signals from a multi-phase DC/DC converter. Referring now to FIGS. 4A and 4B, a current mode control circuit 60 according to the present invention is shown. The current mode control circuit 60 includes a current comparing module 62 and a current mode control module 64. In the present implementation, the current mode control module 64 is a current mode controller such as a peak (i.e. maximum) current mode controller, an average current mode controller, or a valley (i.e. minimum) current mode controller.

The current comparing module 62 receives inductor current signals 66-1, 66-2, ..., and 66-n, referred to collectively as inductor current signals 66, from a multi-phase DC/DC converter circuit 68 as shown in FIG. 4A. Alternatively, the current comparing module 62 may receive the inductor current signals 66 from multiple DC/DC converter circuits 70-1, 70-2, ..., and 70-n, referred to collectively as DC/DC converter circuits 70, as shown in FIG. 4B.

Figure 4C:
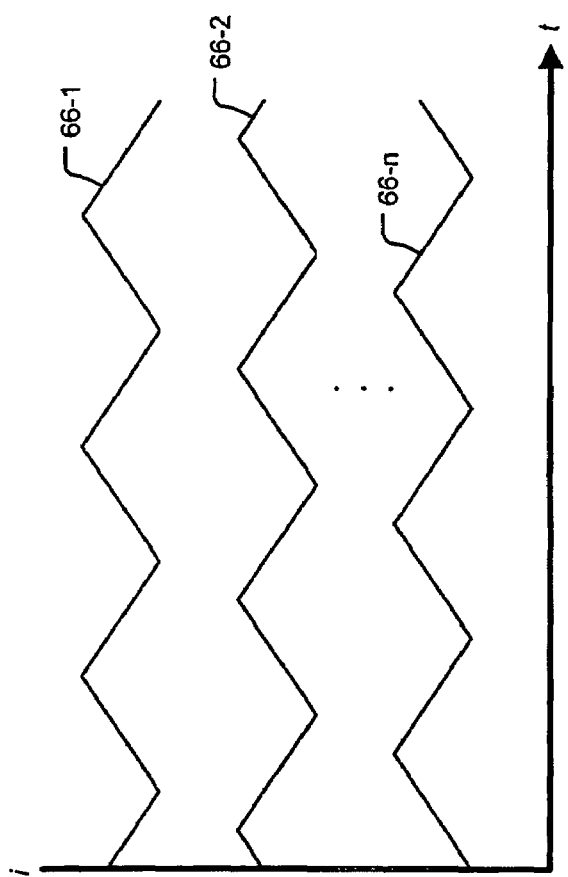
FIG. 4C illustrates exemplary inductor current signal waveforms according to the present invention.
Figure 4D:
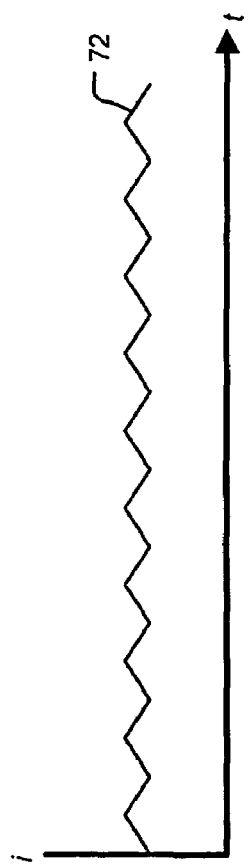
FIG. 4D illustrates an exemplary current comparing module output current waveform according to the present invention.

The current comparing module 62 compares the inductor current signals 66 to determine which of the inductor current signals 66 is highest (i.e. to determine the inductor current signal 66 that has the highest amplitude). The current comparing module 62 outputs a current signal 72 that is indicative of the inductor current signal 66 that has the highest amplitude. In other words, the current comparing module 62 is a "high-win" circuit that outputs only the highest of the inductor current signals 66. Exemplary out-of-phase current signal waveforms of the inductor current signals 66-1, 66-2, ..., and 66-n are shown in FIG. 4C. An exemplary current signal waveform of the current signal 72 is shown in FIG. 4D.

Referring to FIGS. 4A and 4B, the current mode control module 64 receives the current signal 72. The current mode control module 64 generates a PWM signal 74 according to the current signal 72 and a current mode control configuration of the current mode control module 64. Although the present implementation demonstrates current mode control based on inductor current signals, those skilled in the art can appreciate that other signals may be used as feedback signals. For example, the present invention may be implemented to generate the PWM signal 74 according to one or more voltage signals of the multi-phase DC/DC converter 68 and/or the DC/DC converters 70.

The multi-phase DC/DC converter circuit 68 receives the PWM signal 74. The multi-phase DC/DC converter circuit 68 receives an input voltage 76 and outputs an output voltage 78 as described above with respect to previous figures. For example, the multi-phase DC/DC converter circuit 68 may include one or more semiconductor switches as described in FIG. 1. The PWM signal 74 turns the semiconductor switches ON and OFF according to the configuration of the current mode control module 64. In another implementation, the multi-phase DC/DC converter circuit 68 includes a DC/DC control module as described in FIG. 1. The DC/DC control module receives the PWM signal 74 and turns the semiconductor switches ON and OFF according to the PWM signal. Similarly, the DC/DC converter circuits 70 receive the PWM signal 74 and input voltages 80. The DC/DC converter circuits 70 output one or more output voltages 82 that are combined into a single output voltage 84. The DC/DC converter circuits 70 may each include a DC/DC control module and one or more semiconductor switches as described above.

Figure 5:
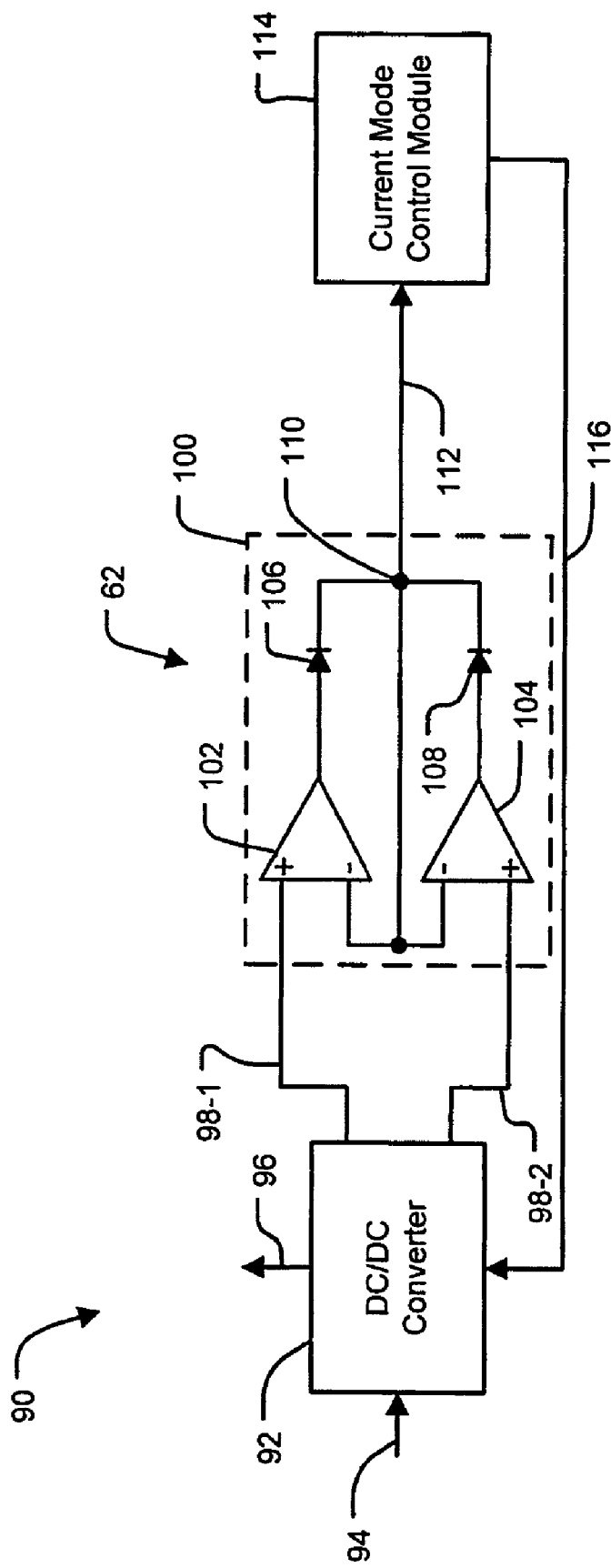
FIG. 5 is a functional block diagram of a current mode control circuit that illustrates a current comparing module in further detail according to the present invention.

Referring now to FIG. 5, the current comparing module 62 is shown in more detail in a current mode control circuit 90. A DC/DC converter (i.e. a voltage control module) 92 receives an input voltage 94 and outputs an output voltage 96 as described in previous implementations. The DC/DC converter 92 is a multi-phase DC/DC converter that generates an analog first phase current signal 98-1 and an analog second phase current signal 98-2, referred to collectively as current signals 98.

The current comparing module 62 is an analog "OR" amplifier circuit 100 that compares two or more analog current signals. In the present implementation, the amplifier circuit 100 receives and compares the current signals 98. The amplifier circuit 100 includes first and second comparators (i.e. amplifiers) 102 and 104 and first and second diodes 106 and 108. The first and second diodes 106 and 108 are configured to allow only current flowing in a first direction through to an output node 110. In this manner, a control current signal 112 will resemble the current signal waveform as shown in FIG. 4D. Those skilled in the art can appreciate that other suitable circuits may be used to provide the OR function of the analog OR amplifier circuit 80. A current mode control module 114 receives the control current signal 112 and generates a PWM control signal 116 accordingly.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A current mode control circuit comprising:
a voltage control module that receives an input voltage and a switching control signal, that generates an output voltage according to the input voltage and the switching control signal, and that generates first and second current feedback signals;
a current comparing module that receives the first and second current feedback signals and that outputs a greater one of the first and second current feedback signals as a control current signal;
a current mode control module that receives the control current signal and generates the switching control signal according to the control current signal.

2. The current mode control circuit of claim 1 wherein the voltage control module is a DC/DC converter.

3. The current mode control circuit of claim 2 wherein the DC/DC converter is at least one of a step-down converter and a boost converter.

4. The current mode control circuit of claim 2 wherein the DC/DC converter is a multi-phase DC/DC converter.

5. The current mode control circuit of claim 1 wherein the voltage control module includes a first DC/DC converter that generates the first current feedback signal and a second DC/DC converter that generates the second current feedback signal.

6. The current mode control circuit of claim 1 wherein the voltage control module includes at least one inductive device.

7. The current mode control circuit of claim 6 wherein the first and second current feedback signals are indicative of a current flowing through the at least one inductive device.

8. The current mode control circuit of claim 1 wherein the voltage control module includes at least one semiconductor switch and the switching control signal transitions the at least one semiconductor switch between first and second states.

9. The current mode control circuit of claim 1 wherein the first current feedback signal is in a first phase and the second current feedback signal is in a second phase.

10. The current mode control circuit of claim 1 wherein the current comparing module is a high-win amplifier circuit.

11. The current mode control circuit of claim 1 wherein the current comparing module is an analog OR circuit.

12. The current mode control circuit of claim 1 wherein the current mode control module is a pulse width modulation (PWM) module and the switching control signal is a PWM signal.

13. The current mode control circuit of claim 1 wherein the current mode control module is at least one of a peak current mode controller, an average current mode controller, and a valley current mode controller.

14. A current mode control circuit comprising:
- a DC/DC converter that receives an input voltage and a PWM control signal, that generates an output voltage according to the input voltage and the PWM control signal, and that generates first and second current feedback signals;
- a current comparing module that receives the first and second current feedback signals and that outputs a greater one of the first and second current feedback signals as a control current signal;
- a PWM control module that receives the control current signal and generates the PWM control signal according to the control current signal.

15. The current mode control circuit of claim 14 wherein the first and second current feedback signals are synchronous and phase shifted.

16. The current mode control circuit of claim 14 wherein the DC/DC converter includes first and second inductive devices, wherein the first current feedback signal is indicative of a current flowing through the first inductive device and the second current feedback signal is indicative of a current flowing through the second inductive device.

17. The current mode control circuit of claim 14 wherein the voltage control module includes first and second semiconductor switches and the PWM control signal transitions the first and second semiconductor switches between first and second states.

18. The current mode control circuit of claim 14 wherein the current comparing module is an analog OR circuit.

19. The current mode control circuit of claim 14 wherein the PWM control module is at least one of a peak current mode controller, an average current mode controller, and a valley current mode controller.

* * * * *